United States Patent [19]

Brosh et al.

[11] Patent Number: 5,644,286
[45] Date of Patent: Jul. 1, 1997

[54] POWER BUS DIGITAL COMMUNICATION SYSTEM

[75] Inventors: Richard M. Brosh, Woodbridge; Charles A. Dennis, Warrenton; Scott C. Willis, Manassas, all of Va.

[73] Assignee: Lockheed Martin Corporation, Bethesda, Md.

[21] Appl. No.: 131,346

[22] Filed: Oct. 4, 1993

[51] Int. Cl.$^6$ ................................................. H04M 11/04
[52] U.S. Cl. ..................... 340/310.01; 340/310.02; 340/310.06; 340/310.07; 340/538
[58] Field of Search ................... 340/310.01, 310.02, 340/310.03, 310.06, 310.07, 538, 558

[56] References Cited

U.S. PATENT DOCUMENTS

| | | | |
|---|---|---|---|
| 3,909,821 | 9/1975 | Jagoda et al. | 340/310.03 |
| 4,123,748 | 10/1978 | Otani | 340/558 |
| 4,622,535 | 11/1986 | Ise et al. | 340/310.01 |
| 4,639,714 | 1/1987 | Crowe | 340/310.01 |
| 4,675,648 | 6/1987 | Roth et al. | 340/310.07 |
| 4,835,516 | 5/1989 | Kutschera et al. | 340/310.01 |
| 4,910,628 | 3/1990 | Minagawa et al. | 340/310.02 |
| 5,210,519 | 5/1993 | Moore | 340/310.07 |

*Primary Examiner*—Jeffery Hofsass
*Assistant Examiner*—Daryl C. Pope
*Attorney, Agent, or Firm*—Joseph C. Redmond; Mark A. Wurm

[57] ABSTRACT

A power bus digital communication system reduces power and signal cabling in a space satellite by transformer coupling digital signal sources to power bus circuits, the transformer coupling devices in all power bus circuits being in parallel relation and electrically isolated from a power supply whereby the digital communication sources may communicate among themselves at a DC power level using a square wave modulated according to a Manchester code.

4 Claims, 1 Drawing Sheet

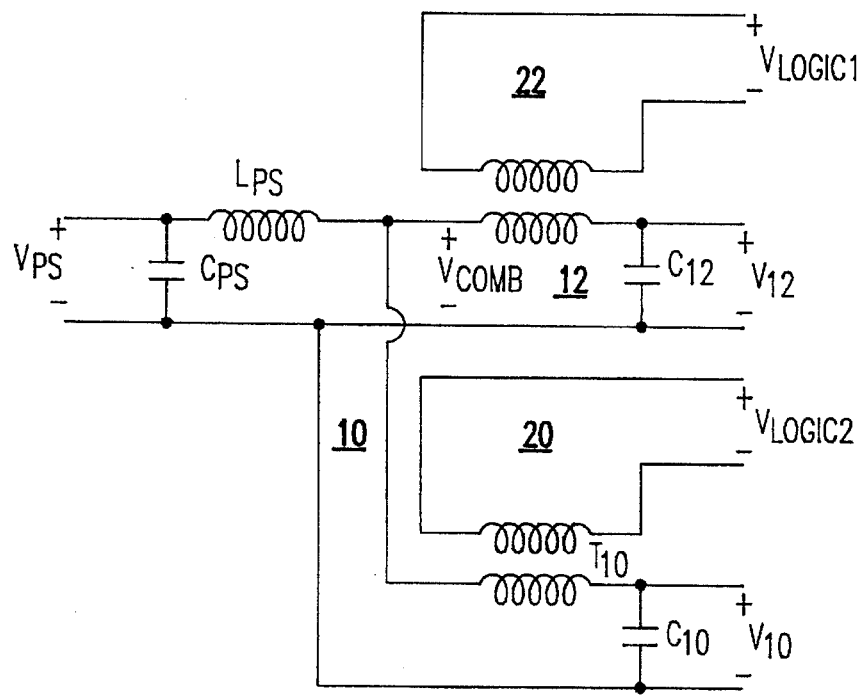
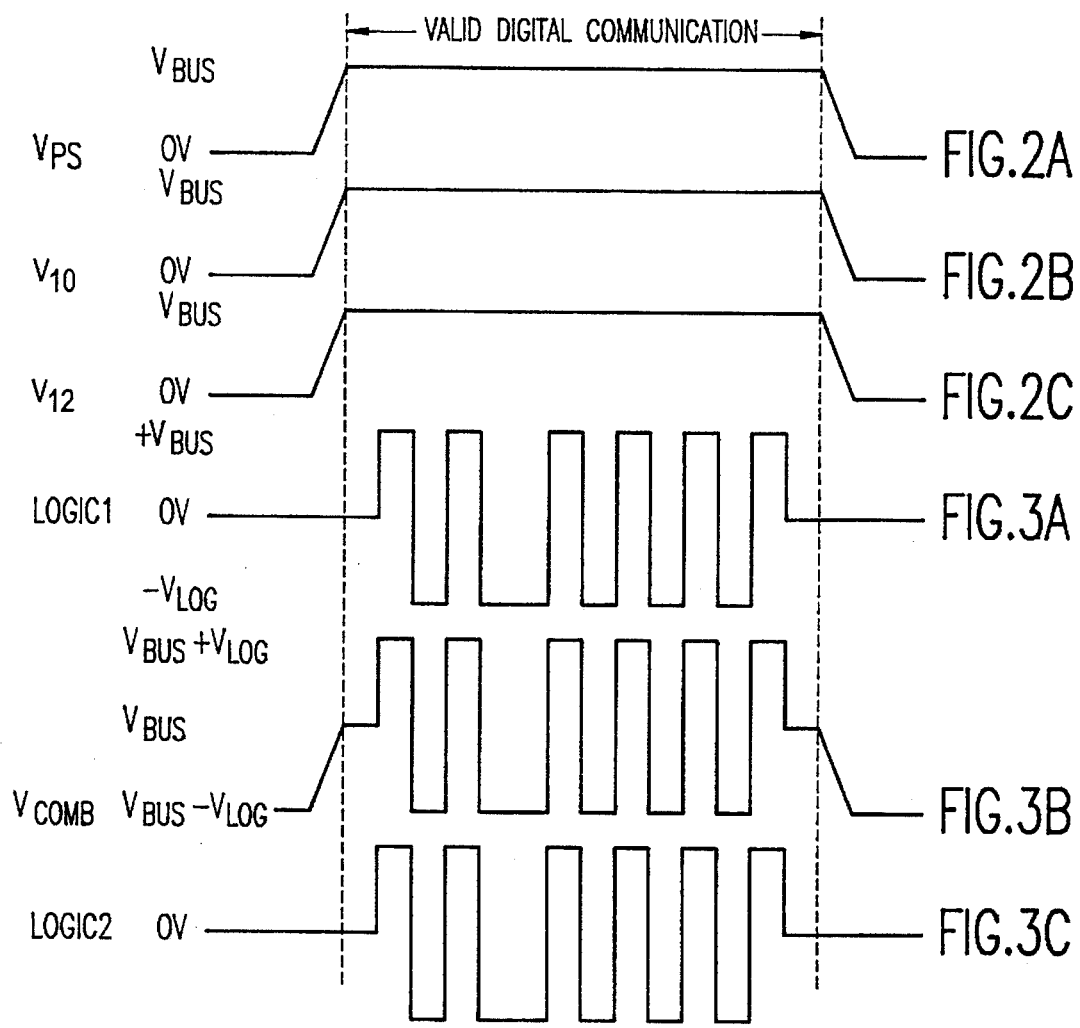

POWER BUS DIGITAL COMMUNICATION SYSTEM

BACKGROUND OF THE INVENTION

1. Field of the Invention

This invention relates to a combined power transmission and electronic communication system and method of combining a power bus carrier and multiple communications signals. More particularly, the invention relates to multiple digital communication sources interconnected over power lines for communication thereamong thereby reducing cable weight and size in space applications, particularly satellites.

2. Description of the Prior Art

Because of the cost of launching satellites, techniques are required to minimize weight. Electrical cables used internally to distribute power and digital signals are a substantial portion of the total weight in space satellites. By combining the signal cables with the power cables, a weight savings can be realized. This is especially true in large command and control satellite systems.

The prior art discloses several examples of combined power and communications systems. In one example, U.S. Pat. No. 4,123,748, a burglar alarm system is described utilizing ultrasonic waves capacitively coupled as a signal on a DC power line. The capacitive coupling provides isolation but reduces the communication bandwidth of the system. In another example, U.S. Pat. No. 4,639,714, electrical power and communications signals are transmitted concurrently along a common electrical conductor. The electrical power signal is converted to a high frequency electrical power signal which is modulated as a function of the electrical communication signal. After the high frequency power signal is transmitted across an inductive coupler, the high frequency signal is converted to an appropriate DC or other electrical power signal and a communications signal. In still another example, U.S. Pat. No. 4,835,516, an audio frequency signal is capacitively coupled to a power line supply which limits the frequency bandwidth of the communication system. None of the prior art addresses the problem of weight and space for electrical power and communications systems in space applications. Either the combined power and communications systems are complicated, as in the '714 patent or they are bandwidth limited as in the '516 and '748 patents. The present invention, in contrast, provides an inductively coupled communications system and power transmission line which is not bandwidth limited and serves multiple digital sources, thereby reducing cable weight and space in a satellite.

SUMMARY OF THE INVENTION

It is an object of the invention to provide a power bus communication system suitable for space applications.

Another object of the invention is to provide a power bus communication system adapted to handle multiple digital communication sources on the power bus, whereby the communication sources are not bandwidth limited by the bus and the sources can communicate among themselves.

These and other objects are accomplished in a plurality of power conducting or bus circuits, each circuit connected between a power supply and a load. A digital signal coupling device is connected into each power conducting circuit for coupling a digital transceiver source to each power conducting circuit. The coupling devices for each digital transceiver source are effectively in electrically parallel relation through a low impedance element connected across each power bus circuit.

An impedance is connected in the power circuit to isolate the power supply from each coupled digital source, whereby when a digital source provides a modulated square wave on the order of one megahertz, the square wave is added to the power supply voltage to provide an input to other digital transceiver sources which use the modulated square wave as digital information. In one form, the square wave can be transmitted as Manchester code for which a detailed description is given in US Military Standard 1553, dated Sep. 15, 1978. In another form, the isolating impedance element may be included in each digital coupling device.

BRIEF DESCRIPTION OF THE DRAWINGS

FIG. 1 is a circuit diagram of the present invention.

FIGS. 2A–C shows power levels at the power supply and on the power conducting circuits of FIG. 1.

FIG. 3A shows the logic voltage levels of a transceiver as a digital source in a communication circuit.

FIG. 3B shows the combined power and logic levels on a power conducting circuit.

FIG. 3C shows the logic voltage levels at a transceiver as a receiver in a communication circuit.

DESCRIPTION OF THE PREFERRED EMBODIMENT

FIG. 1 shows a power distribution and communication system for a space satellite which reduces cable weight and input/output connections within the satellite. Cable weight is saved in the satellite by combining the power and serial digital communication buses. Input/output connectors are reduced by a fewer number of cables required by the system relative to prior art systems, as will be discussed hereinafter. In FIG. 1, a plurality of power buses $10, 12 \ldots$ are connected to a power supply Vps, typically a 28 volt DC power source. The power supply is connected to the busses 10, 12 through a filter capacitor Cps and an inductor element Lps. The inductor element Lps is chosen to provide a high impedance to a digital switching frequency, as will be explained hereinafter. Each power bus circuit terminates in a load element V11, V12 which may be of any form, but typically are logic circuits powered from the bus. A plurality of digital communication circuits 20, 22 are coupled to an associated power bus 10, 12 though an associated broad band coupling transformer T10, T12. A capacitor C10, C12 is coupled across each power bus T10, T12. Each coupling device T10, T12 includes additional inductance to isolate digital signals on power bus circuits 10, 22 from the power supply Vps while supplying the digital signals to communication circuits coupled to a power bus circuit. A capacitor C10, C12 is coupled across each power bus to block any digital signal to the load and serves as a low impedance, path, for high frequencies, as will be explained hereinafter. Each digital communication circuit includes a digital transceiver source Vlogic1, Vlogic2. In one form, the digital transceiver source could be a dual channel transmitter-receiver module, such as that built by ILC Data Device Corporation, Sterling, Va. and identified as BUS-8553. The amplitude for the digital signal is nominally 10 volts plus and minus with a switching frequency of 1 MHz. The capacitance value of the capacitors C10, C12, etc., which is chosen to present a low impedance path to the digital signals at 1 MHz, effectively places all the coupling transformers in parallel relation and permits communication among the digital transceiver sources. The combined power/logic signal has a nominal value of 28 volts and a minimum and maximum value of 18 volts and 38 volts, respectively.

In FIG. 2, a voltage diagram shows the voltage level at the power supply Vps (FIG. 2A) and in the power supply buses Vl1 (FIG. 2B) and Vl2 (FIG. 2C). Valid communication only occurs among the digital communication circuits when the power source voltage has reached the power source amplitude, typically 28 volts DC in the voltage busses, as show in FIGS. 2B and C.

To communicate among the communication circuits, a 1 MHz square wave is modulated by a transceiver, VLogic1 or Vlogic2 as the case maybe, according to a Manchester Code, as shown in FIG. 3A. The Manchester Code is described in US Military Standard 1553, dated Sep. 15, 1978. In the case of Vlogic1 supplying the code, coupling unit T10, couples the code onto the power bus voltage, as shown in FIG. 3B. The inductor Lps provides an impedance greater than the equivalent transformer coupling impedance at the digital switching frequency which isolates the power supply Vps from the communication circuits. The inductance of Lps has the added benefit of filtering any ripple from Vps the power source. In a specific embodiment, the inductor Lps could be included as a part of each transformer coupler which would block signals to the other transformer couplers. In that way one device the couplers serve two purposes. Accordingly, the coupled Manchester Code is isolated from the power source Vps. While the inductor Lps presents a high impedance, the capacitor C10 provides a low impedance to the digital signal shown in FIG. 3A. This low impedance together with the inductor Lps commons the digital sources to the power supply which effectively places all coupling transformers on the power busses in parallel providing a digital communication path to all digital communication circuits. Each digital communication circuit also includes a DC/DC converter (not shown) to convert the primary 28 volts DC level to 5 volts DC which is required by the digital communications circuits. The converters also attenuate any high frequency noise caused by the digital signals that appear on the filtering capacitors C10, C12 as the case maybe.

In a specific embodiment, the digital source Vlogic1, for example, would generate a coded signal 30 of the type shown in FIG. 3A. As part of the coded signal, an address would be included which would identify the source to which the coded signal was directed. The coded signal 30 would be transformer coupled to the power level of power bus 12 (see FIG. 3B) and all other transformers since they are all in parallel with respect to the power bus. The coded signal 30 would be coupled to each digital signal source Vlogic1, etc., but only the source(s) with the correct address(es) would accept the coded signal.

Manchester Coding is particularly suited to the invention as it was developed to be used with a transformer having one or more parallel receivers. Other forms of signal coding could be used, however, for example, amplitude modulation, frequency modulation, multiple shift keying, etc.

An alternative implementation of the invention is to install a redundant 28 volt DC distribution bus (not shown). The redundant bus is constructed in the same manner, as shown in FIG. 1. All communication circuits Vlogic 1, 2, etc. would be coupled together on a single distribution bus rather than on multiple distribution buses.

Presently, power and distribution systems for a satellite involving ten communication units would require a power cable consisting of two conductors to each logic unit for a total of ten and a digital cable with two conductors among the ten units for a digital cable total of nine, which would mean 19 cables and 20 input/output connectors would be involved. In contrast, the present invention only requires ten power cables which also contain the digital signal. Accordingly, the power digital bus digital communicator only involves ten cables and ten input/output connectors which reduces the number of cables by nine and the connectors by ten relative to present power and distribution systems for satellite systems. Further, the present invention adds very little additional circuitry to the standard satellite power and communication distribution systems. In the case of prior systems, the power supply in each unit has a filtering inductor and capacitor which can be used in the present invention. All that is required above that is a coupling transformer which may be as simple as adding a winding to the power converter filter inductor of the standard approach.

While the invention has been particularly shown and described with reference to the preferred embodiment, it will be understood that various changes of form and details may be made therein without the departing from the spirit and scope of the invention.

What is claimed is:

1. A power bus digital communication system for a space satellite system comprising:
   a) a plurality of power conducting circuits 10, 12, each circuit connected in parallel between a DC power supply Vps and a load Vl1, Vl2;
   b) a plurality of digital transceiver sources Vlogic1, Vlogic2 for transmitting and receiving digital signals;
   c) a plurality of digital signaling coupling devices T10, T12, each digital signaling coupling device including a broad band transformer and an impedance element C10, C12 for coupling a digital transceiver source to an associated load Vl1, Vl2, each said broad band transformer connected in series between one terminal of said power supply Vps and its associated load Vl1, Vl2 with said impedance element C10, C12 providing a low impedance path across each said associated load Vl1, Vl2, each said digital coupling device T10, T12 including additional inductance to isolate digital signals on the power conducting circuits 10, 22 from the associated load Vl1, Vl2 while supplying digital signals to the digital transceiver sources and DC power to each associated load Vl1, Vl2;
   d) the digital signaling coupling devices in the respective power conducting circuits being in electrically parallel relation to said DC power supply; and
   e) a power supply impedance element LPS for isolating the DC power supply from the coupled digital transceiver signal sources;
   whereby digital communications are completed among the digital transceivers sources by using the power conducting circuits as a carrier for the digital signals while supplying DC power to each load thereby saving weight and size in the space satellite system.

2. The system of claim 1 wherein the digital transceiver sources modulate the digital signals using a square wave.

3. The system of claim 2 wherein the square wave is modulated in accordance with a Manchester code and encoded with an address to identify a digital transceiver source to which the digital signals are directed.

4. A power bus digital communication system for a space satellite system comprising:
   a) a plurality of power conducting circuits 10, 12, each circuit connected in parallel between a DC power supply Vps and a load Vl1, Vl2;
   b) a plurality of digital transceiver sources Vlogic1, Vlogic2 for transmitting and receiving digital signals;

c) a plurality of digital signaling coupling devices T10, T12, each digital signaling coupling device including a broad band transformer and an impedance element C10, C12 for coupling a digital transceiver source to an associated load Vl1, Vl2, each said broad band transformer connected in series between one terminal of said power supply Vps and its associated load Vl1, Vl2 with said impedance element C10, C12 providing a low impedance path across each said associated load Vl1, Vl2, each said digital coupling device T10, T12 supplying digital signals to the digital transceiver sources and DC power to each associated load Vl1, Vl2;

d) the digital signaling coupling devices in the respective power conducting circuits being in electrically parallel relation to said DC power supply; and e) a power supply impedance element LPS for isolating the DC power supply from the coupled digital transceiver signal sources;

whereby digital communications are completed among the digital transceivers sources by using the power conducting circuits as a carrier for the digital signals while supplying DC power to each load thereby saving weight and size in the space satellite system.

\* \* \* \* \*